US008958922B2

(12) United States Patent
Blank et al.

(10) Patent No.: US 8,958,922 B2
(45) Date of Patent: Feb. 17, 2015

(54) SYSTEM AND METHOD FOR OPTIMIZED DECISION-MAKING IN WATER SUPPLY NETWORKS AND/OR WATER SUPPLY OPERATIONS

(75) Inventors: Frederik Blank, Heidelberg (DE); Markus Gauder, Hockenheim (DE); Heinrich-Martin Schreyer, Heppenheim (DE); Stefan Lauxtermann, Porta Westfalica (DE)

(73) Assignee: ABB Technology AG, Zürich (CH)

( * ) Notice: Subject to any disclaimer, the term of this patent is extended or adjusted under 35 U.S.C. 154(b) by 763 days.

(21) Appl. No.: 13/107,271

(22) Filed: May 13, 2011

(65) Prior Publication Data
US 2011/0264282 A1 Oct. 27, 2011

Related U.S. Application Data

(63) Continuation of application No. PCT/EP2009/008083, filed on Nov. 13, 2009.

(30) Foreign Application Priority Data

Nov. 14, 2008 (DE) .......................... 10 2008 057 442

(51) Int. Cl.
G05D 7/00 (2006.01)
G01F 1/00 (2006.01)
(Continued)

(52) U.S. Cl.
CPC ................ *G05B 15/02* (2013.01); *G06Q 10/06* (2013.01); *G06Q 50/06* (2013.01)
USPC ............. 700/282; 700/283; 700/284; 73/861; 73/861.59; 73/202.5; 137/1; 702/5; 702/7; 702/61; 702/62

(58) Field of Classification Search
CPC ....... G05D 7/00; G01D 21/00; G01F 23/0069
See application file for complete search history.

(56) References Cited

U.S. PATENT DOCUMENTS 7,269,569 B2 * 9/2007 Spira et al. .................... 705/7.36
2002/0035495 A1 * 3/2002 Spira et al. ........................ 705/7
(Continued)

FOREIGN PATENT DOCUMENTS

DE 2005 005 491 U1 6/2005
EP 1 324 165 A2 7/2003
GB 2 405 514 A 3/2005

OTHER PUBLICATIONS

International Search Report (PCT/ISA/210) issued on Feb. 12, 2010, by European Patent Office as the International Searching Authority for International Application No. PCT/EP/2009/008083.

Primary Examiner — Kavita Padmanabhan
Assistant Examiner — Sunray R Chang
(74) Attorney, Agent, or Firm — Buchanan Ingersoll & Rooney PC

(57) ABSTRACT

A system and method are provided for optimized decision-making in water supply networks and/or water supply operations. The system includes at least one central data processing device and a control system having at least one integration device. The system also includes at least one functional unit for identifying and/or processing status information affecting the respective network or operation. The functionality of the at least one functional unit can be integrated and/or incorporated into the control system by means of the integration device such that the control system functionality is expanded by the functionality of the respective functional unit and/or control system, and the at least one function unit cooperates such that individual functions and/or the functionality of the respective functional unit can be called up and/or executed and/or utilized via the integration unit and/or the control system, and resulting additional status information can be obtained and provided for decision-making, for example, relating to a technical task or technical problem.

13 Claims, 2 Drawing Sheets

(51) Int. Cl.
*E03B 1/00* (2006.01)
*G01B 3/38* (2006.01)
*G01R 21/00* (2006.01)
*G05B 15/02* (2006.01)
*G06Q 10/06* (2012.01)
*G06Q 50/06* (2012.01)

(56) References Cited

U.S. PATENT DOCUMENTS

2002/0138358 A1\* 9/2002 Scheer .................. 705/26
2005/0137752 A1\* 6/2005 Alvarez ................. 700/282
2006/0117295 A1 6/2006 Wu et al.

\* cited by examiner

SYSTEM AND METHOD FOR OPTIMIZED DECISION-MAKING IN WATER SUPPLY NETWORKS AND/OR WATER SUPPLY OPERATIONS

RELATED APPLICATION

This application claims priority as a continuation application under 35 U.S.C. §120 to PCT/EP2009/008083, which was filed as an International Application on Nov. 13, 2009 designating the U.S., and which claims priority to German Application 10 2008 057 442.2 filed in Europe on Nov. 14, 2008. The entire contents of these applications are hereby incorporated by reference in their entireties.

FIELD

The present disclosure relates to a system and a method for optimized decision-making in water supply grids and/or water supply operations, such as for the operation and maintenance of facilities for water production and/or water distribution, for example.

BACKGROUND INFORMATION

The operation and maintenance of grids for transporting and distributing water are linked to the instances of comparatively complex decisions. These decisions govern the effectiveness and efficiency of the operation and maintenance of the grids. The degree of complexity arises from a large number of aspects, for example, technical, commercial or legal aspects, and dependencies which can be influenced by the respective decision or can be taken as a basis for a decision. Decisions may additionally take account of various time horizons, which likewise increases the degree of complexity. The making of decisions concerns the stipulation and prioritization of measures for maintaining or improving the operation of the water grids (operative aspects), such as action planning for pumping stations and prioritization, planning and implementation of maintenance measures, such as necessary repairs for remedying leaks in the short term.

In order to support decision-making by the management, operators or maintainers, various software-based systems and/or applications are known to be used which provide different functionalities and hence depict only subaspects of the decision-making process. Reasons for the large number of systems and/or applications are firstly comprehensive systems for decision support which are absent, unavailable on the market, but secondly also the historical development for the water suppliers, particularly in respect of their own developments in computer-aided and/or software-based systems and/or applications.

By way of example, individual systems and/or applications of this kind cover the areas of action planning for pumping stations, pressure management or maintenance planning on the basis of—frequently estimated and/or assumed—information about the current state (actual state) of the grid.

Systems and/or applications of this kind generally use different data records and databases as a source and for dumping data, which ultimately means reduced efficiency, since continuous systematic use of new integration concepts is not envisaged and/or cannot be applied.

The use of different systems and/or applications with individual functionalities as "standalone" systems (insular systems) and/or applications requires a change between the systems and/or applications and also requires provision of respectively required information and data, particularly having a structure and/or data format which is customized to the respective system or to the respective application, in order to be able to employ or use a system and/or an application using results from further systems and/or applications that are used.

Thus, by way of example, results from the calculations relating to pressure management cannot be employed for use in action planning without additional involvement.

In addition, as already indicated, the decision-making is based on different data sources, such as historical and/or application-specific databases, which have to date been operated as standalone databases/systems on account of an absence of integration into an overall system. Not only does the assembly of information from the various standalone databases represent considerable additional time involvement, the manual search for information means that important data records can be overlooked, as a result of which the risk of error is increased.

For more effective and efficient decision-making for the area of water distribution and/or water transportation, the use of a comprehensive and integrative approach is of crucial significance. This approach provides the incorporation into the control system environment, which means that not only historical, structural, simulation, topology, grid, maintenance and further data can be used within the context of the decision-making but also realtime data which reflect the current state of the grid. The incorporation of systems and/or applications by means of standardized interfaces allows central data storage, data management and provision of required data and information as an elementary basis for decision-making and planning support.

Necessary decisions concern the operation, planning and maintenance of water grids (transportation and distribution). For example, decisions which concern maintenance may address tactical, short-term measures such as the stipulation of necessary repair measures, or else longer-term strategic measures such as the removal or reinstallation or restoration of pipeline grids. The integrative approach could reduce the degree of complexity for the respective decision-maker accordingly.

From a current point of view, however, there are disadvantageously neither comprehensive, integrated systems for supporting decision-making nor—in respect of the functionality of such a system—a standard paraphrase, i.e. that the water suppliers employ different systems and/or applications in different forms. In this case, it should be remembered that systems and/or applications are known which are typically used for making decisions but are usually only insular solutions which are quite incapable of resorting to a completely integrated database and hence only take account of subaspects in the decision or can be used only in certain areas.

In view of the above, exemplary embodiments of the present disclosure provide a means of improved and efficient decision-making.

SUMMARY

An exemplary embodiment of the present disclosure provides a system for optimized decision-making for water supply grids and/or water supply operations. The exemplary system includes at least one central data processing device, a control system having at least one integration device, and at least one functional unit configured to at least one of determine and process state information concerning at least one of the grids and operations, respectively. The integration device is configured to prompt at least one of integration and incorporation of the functionality of the at least one functional unit into the control system such that at least one of (i) functionality of the control system is extended by the functionality of the respective functional unit and (ii) the control system and the at least one functional unit interact such that individual functions and/or the functionality of the respective functional unit is at least one of called, executed and used by means of at least one of the integration device, the control system at least one further functional unit. Furthermore, the integration device is configured to enable, through integration with the control system and the at least one functional unit, state information to be obtained and provided for decision-making concerning at least one of a technical task and a technical problem.

An exemplary embodiment of the present disclosure provides a method for optimized decision-making for water supply grids and/or water supply operations. The exemplary method includes, in at least one integration device in interaction with a control system and at least one functional unit having at least one functionality, using the functionality of the at least one functional unit to at least one of determine and process state information concerning the respective grid or the operation. The exemplary method also includes integrating, in the at least one functional device, the functionality of the at least one functional unit into the control system such that functionality of the control system functionality is extended by the functionality of the respective functional unit. In addition, the exemplary method includes integrating, in the at least one functional device, the functionality of the at least one functional unit into the control system such that at least one of individual functions and the functionality of the respective functional unit are at least one of called, executed and used by means of the at least one of the integration device, the control system and at least one further functional unit, such that additional state information is obtained and provided for decision-making concerning at least one of a technical task and a technical problem.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
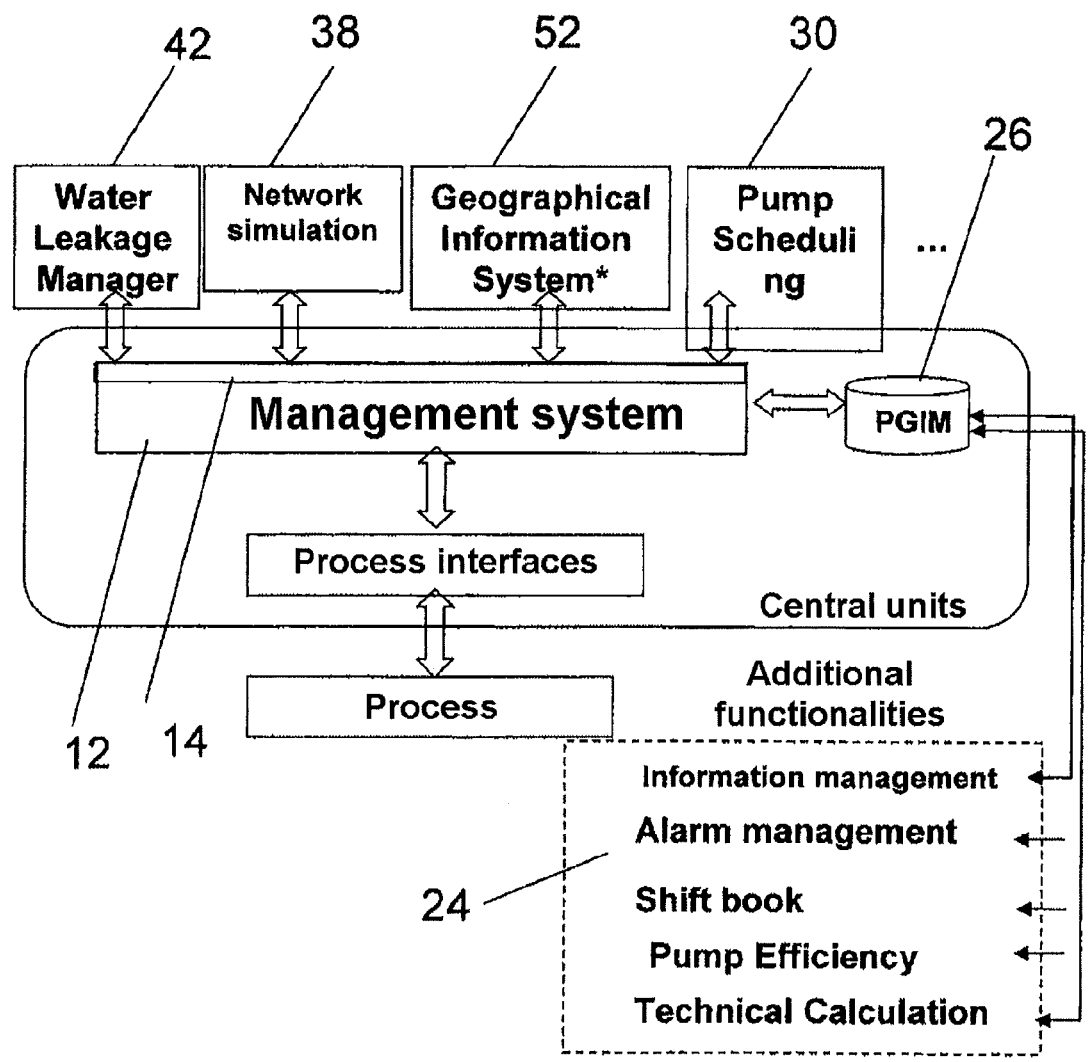
FIG. 1 shows a system for optimized decision-making for water supply grids and/or water supply operations, according to an exemplary embodiment of the present disclosure.

Exemplary embodiments of the present disclosure provide a system and method for optimized decision-making, for example, in the field of water supply grids and/or water supply operations. Advantageous refinements and developments of the system and method are specified in the description below.

The present disclosure places the integrative approach in the foreground and describes functions which are required for optimized operation and for maintenance and also upkeep of water grids.

An exemplary embodiment of the present disclosure provides a system for optimized decision-making for water supply grids and/or water supply operations. The exemplary system includes at least one central data processing device and a control system having at least one integration device. The exemplary system also includes at least one functional unit for determining and/or processing state information concerning the respective grid or the operation. The integration device is configured to prompt integration and/or incorporation of the functionality of the at least one functional unit into the control system such that the control system functionality is extended by the functionality of the respective functional unit. Furthermore, the integration provided by the integration device enables the control system and the at least one functional unit to interact such that individual functions and/or the functionality of the respective functional unit can be called and/or executed and/or used by means of the integration device and/or the control system and/or at least one further functional unit. Consequently, additional state information can be obtained and provided for decision-making particularly concerning a technical task or a technical problem.

According to an exemplary embodiment, the integration device can function as a connection or linking interface between the process, the planning and the maintenance and also the functional units required for the operation and the functionalities of the functional units, which functionalities can usually be used and/or applied using callable applications and applications which can be executed on said functionalities.

Another exemplary embodiment provides a method for optimized decision-making for water supply grids and/or water supply operations. In the method, at least one integration device in interaction with a control system and also at least one functional unit are used, using the provided functionalities, to determine and/or process state information concerning the respective grid or the operation, wherein the functionality of the at least one functional unit is integrated and/or incorporated into the control system such that the control system functionality is extended by the functionality of the respective functional unit and/or individual functions and/or the functionality of the respective functional unit can be called and/or executed and/or used by means of the integration device and/or the control system and/or at least one further functional unit. Consequently, additional state information can be obtained and provided for decision-making concerning a technical task or a technical problem.

The integration of various applications and/or functional units not only allows great simplifications for the decision support, but this approach can now also be used for integrated applications to access a diversity of data from other integrated applications and modules. Hence, process control and planning, inter alia, can be improved by also taking account of global aspects instead of purely local aspects, as described previously.

In accordance with an exemplary embodiment of the system, the control system includes an information control function which is not provided as a separate functional unit.

In accordance with an exemplary embodiment, the integration device has not only the integration function but also basic functions for data capture or information capture, monitoring and control of the process.

In accordance with an exemplary embodiment, the system is of modular design, which allows maximum flexibility and diversity of application.

In addition, provision may be made for applications and functional units to be connected and/or to communicate by means of standard interfaces, the use of proprietary interfaces also being possible as an alternative.

In this case, the applications and functionalities can be accessed from the integration device in several ways.

In accordance with an exemplary embodiment, a visual display unit is advantageously provided which communicates with the respective application, which, on the basis of the system, is executed in parallel in the background and/or forwards or transmits selections by the respective user to the application and responses and/or results or outcomes from the respective application to the user.

In accordance with an exemplary embodiment, the integration device has an integration unit which can be used to incorporate and access the operator interfaces or operator elements of the various functional units and applications, so that a direct view of the respective application and/or functional unit from the integration device is possible and can be processed directly in the respective application and/or functional unit.

When integrating functional units and functionalities or applications in this regard, a distinction needs to be drawn regarding the depth of the integration. Thus, a functional unit and/or the application thereof can be incorporated by means of a pure data transfer and also by means of an interface element or operator element integration, in which case a basic distinction needs to be drawn between purely calling an interface or an element and directly navigating to an object within the respective application and/or functional unit.

In addition, according to an exemplary embodiment, it also to be possible to resort to the functionality of a visual display unit in the case of data transfer and/or information interchange, as already indicated.

For effective and efficient operation of water supply grids, such as distribution and transportation, a series of functional units and associated applications may advantageously be provided. The functional units can relate, for example, to the areas of power management, pressure management, leak management, maintenance management and decision support.

On the basis of the relevant dependency of the occurrence of leaks and power consumption on pressure in the water supply grid, related elements can be implemented in an integrated approach.

The exemplary system of the present disclosure combines the control system and the aforementioned units to form an overall system and extends the units reciprocally by additional functions and/or functionalities. In this context, each functionality is part of a functional unit which, on the basis of standards, is in constant interchange with the superordinate control system and hence also with other functional modules.

By providing that all the functional units or the information ascertained and provided by them, such as state information, for example, is/are viewed together or considered, it is possible to produce or bring about optimum results for estimates, decisions, planning and maintenance.

The functions addressed allow comprehensive management and the operation of a water grid.

Possible refinements and functional units which can be used in this regard are indicated below.

In accordance with an exemplary embodiment, a planning unit for action planning and control (e.g., planning and scheduling) for pumping stations, for example, for the optimum and the power-saving actuation of pumps (a planning and scheduling module) is provided.

In accordance with an exemplary embodiment, at least one control unit for the optimized actuation of pressure regulation valves (pressure regulation module) is provided.

In addition, a processing unit for determining the water distribution in the water supply grid by means of mathematicophysical modeling (water distribution model) can be provided.

In accordance with an exemplary embodiment, an estimation unit for estimating the future water demand by means of modeling (water consumption forecast model) may also be provided.

In accordance with an exemplary embodiment, an alarm management unit, alarm management error lists and visual display of the alarms (alarm management module) in the system may be provided.

A prediction unit for predicting and/or recognizing and/or characterizing, localization and visually displaying leaks and pipe fractures (leak unit) may also be provided according to an exemplary embodiment of the present disclosure.

In accordance with an exemplary embodiment, a unit or functional unit for decision support for maintenance and investment planning for the water supply grid and equipment and/or resources in this regard may be provided.

In addition, a functional unit for manually or automatically generating step-by-step instructions for solving problems in the control room or in a field (open loop control module) may be provided and/or integrated.

Furthermore, it is also possible to provide an error correction unit for automatically taking and executing requisite and/or safety-critical applications and/or measures (troubleshooting unit).

In accordance with an exemplary embodiment, a simulation unit for simulating various scenarios (scenario management unit) may also be provided.

Further units which can be used, including in combination, are, for example, the maintenance unit, unit for vulnerability analysis and management and also the visual display unit, the visual display unit containing the function representing geographical data, inter alia.

FIG. 1 shows an exemplary form of a system for optimized decision-making for water supply grids and/or water supply operations. The exemplary system includes at least one central data processing device and a control system 12 having at least one integration device 14. The exemplary system also includes at least one functional unit. In the example shown in FIG. 1, there are four functional units 30, 38, 42, 52, for determining and/or processing state information concerning the respective grid or the operation. The integration device 14 is configured to prompt integration and/or incorporation of the functionalities 24 and of the application of the respective functional units in this regard into the control system 12 such that the functionality of the control system 12 is extended by the functionality of the respective functional unit(s) and/or the control system 12 and the at least one functional unit interact such that individual functions and/or the functionality 24 of the respective functional unit can be called and/or executed and/or used by means of the integration device 14 and/or the control system 12 and/or at least one further functional unit. Accordingly, since the integration device 14 integrates the control system 12 with the respective functional unit(s), additional state information can be obtained and provided for decision-making, particularly concerning a technical task or a technical problem.

According to an exemplary embodiment, provision may be made for some of the control system functions to be made available and/or present in individual functional modules too after the integration, when required.

Furthermore, an information management system 26 is provided which, in interaction with the integration device 14, the control system 12 and the functional units acts and is configured as a central information base and/or database and/or or which can be used to prompt and/or ensure continuous information flow and/or interchange between the control system and the functional units.

Figure 2:
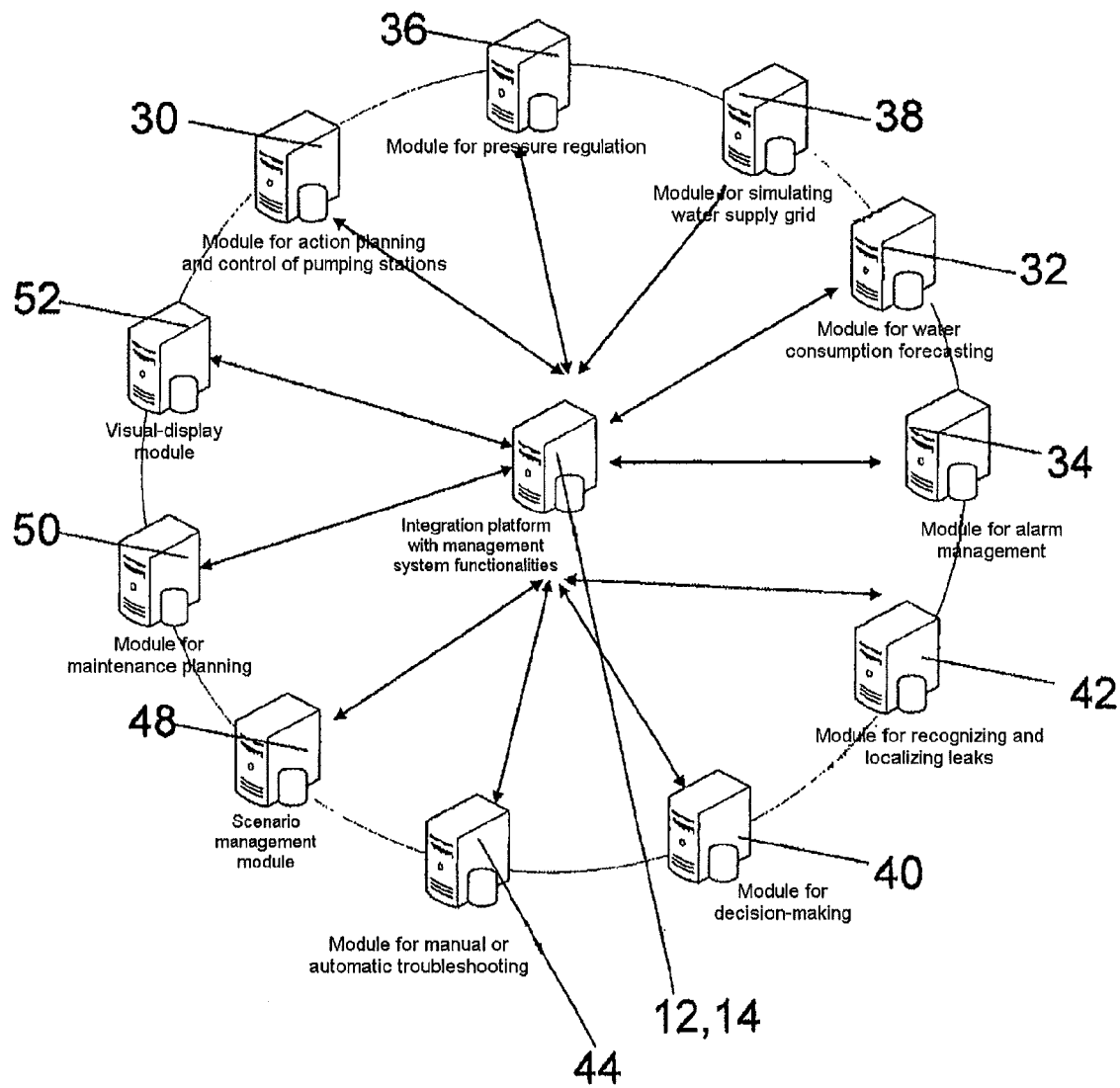
FIG. 2 shows a system in an exemplary form with control-system-external functional units which have been incorporated and/or integrated into the control system by means of an integration device.

Functional units which can be provided in various ways or which can be incorporated into the control system are also indicated in exemplary selection, which is in no way conclusive, in FIG. 2.

In the illustrated exemplary embodiment, the planning unit 30 has the task of optimally actuating the pumps which are used for producing the flow and pressure in the water supply grid. In this case, examples of the optimization variables which can be used are the power employed, the operating costs, the number of pumps required and the pressure regulation valve openings.

The prediction unit 32 provides a locally resolved estimate—for example, one based on GIS information—of the future water consumption in the water supply network, which is used as a basis for the optimization method or the optimization process and particularly the underlying optimization algorithm.

A further input variable for the action planning can be the result of the water distribution model or of a hydraulic water network model which determines or ascertains the distribution of the water and/or of the flows and pressure in the supply grid taking account of the positions of the pressure regulation valves and of the estimated water consumption. This information can be used as a basis for possible subsequent optimization of the use of pumps and also of the associated pump costs by calculating and applying optimum or optimized pump schedules taking account of possible power tariffs, reservoir filling levels and minimum pressure requirements.

In addition to the pumps, reservoirs which are filled by means of pumps may also play an important part (geodetic level).

If the alarm management unit 34 delivers fault reports from pumps, valves or reports a leak in a line section or a grid section, these reports can be taken into account in the water distribution model and in the pump actuation optimization algorithm and reacted to accordingly. For example, faulty pumps are no longer actuated, areas which contain a faulty pressure regulation valve, for example, if the valve is closed or off and can no longer be controlled, need to be fed using a different strategy than previously, and high pressures in lines with leaks need to be avoided, as do additional or further leaks.

If the estimated water consumption values differ from the real water consumption values somewhat, such as beyond a prescribed limit range, then global (whole-system) regulation of the speed of the running pumps and the position of the pressure regulation valves provides automatic adjustment to suit the current situation. If the estimated and real water consumptions differ too greatly, the optimization method or the underlying optimization algorithm, which can be performed at least once a day, for example, is restarted taking account of the current situation. To determine the action planning, a hydraulic grid model is used in which the water supply grid under consideration is modeled accordingly. It is important to consider that determining the optimum action planning requires an optimization calculation to be performed and hence the model to be developed as an optimization model. An appropriate solver solves the optimization problem. The relevant constraints are stipulated when the model is configured. The model can be set up or created using model libraries, which may contain individual models for lines, pressure regulation valves, loads and sources, inter alia.

The basis for the optimization is an optimization model, which is generated automatically on the basis of the simulation model. The optimization model then has the necessary operational and physical constraints added.

According to an exemplary embodiment, the capture and/or modeling can be performed graphically or textually. By way of example, the required data or information can be made available to the action planning unit or planning unit 30 and/or provided retrievable by means of the information management system 26, which forms or provides a common database for the integrated applications, functionalities 24 and functional units.

In accordance with an exemplary embodiment, the data interfaces can be provided in the form of standard interfaces, for example on an OPC basis, with the respective functional unit, functionality and/or application being called and/or executed either on an event-controlled basis, that is to say automatically in the case of changes occurring in the grid state, such as failure of a pump, or on a time basis, e.g., automatically according to appropriately stipulated time cycles, or manually by means of instruction by the operating personnel.

In addition, provision may be made for the period which needs to be taken into consideration for the action planning to be stipulated in accordance with the configuration of the respective functional unit and, by way of example, to be able to comprise a period of 24 hours, so that appropriate predictive scheduling is possible. The time steps for which the respective operating points of the pumps are stipulated are also configurable accordingly and/or in the manner adjusted to suit. A time step may be 15 minutes, for example.

The results of the action planning can be transferred to the information management system and stored therein as relevant time series, for example by means of a standard interface that is provided and set up for this purpose, such as OPC.

In accordance with an exemplary embodiment, at least one pressure regulation unit 36 is provided which brings about optimum pressure conditions in the water supply grid, for example on a rule basis and/or using sensor information and/or measured and characteristic values. Accordingly, a predetermined optimized pump schedule, provided by means of the information management, for example, as the result of the action planning in the form of a time series, and/or the estimated water demand and/or the prevailing pressure for each pressure regulation valve is/are used to ascertain and/or calculate a target opening value which is optimized from the point of view of global power and cost aspects.

This value that has been ascertained globally—over the whole system, that is to say taking account of the whole system—can then be adjusted according to current water demand by a provideable local valve opening realtime regulator. As a basis for the determination, it is possible to use a grid model which is used to ascertain and determine the necessary hydraulic parameters, such as when which valve is opened where in what position and for how long.

As in the case of the action planning, the respective model can be provided as an optimization model, with the respective constraints being stipulated when the respective model is configured. The model can be created and/or generated using model libraries, which may contain individual models for lines, pressure regulation valves, loads and sources, inter alia.

The necessary information and data can be provided for the pressure regulation unit 36 advantageously from the information management system 26, for example by means of a standard interface such as OPC.

In this case, the pressure regulator 36 can follow the time steps (e.g. 15 minutes) configured in the action planning 30 and can also be executed for an appropriate period—as considered in the action planning. The results are stored centrally as appropriate in the information management system 26 and are therefore also available for further applications and/or functional units, for example for the purpose of transmission to the respective actuators.

In accordance with an exemplary embodiment, at least one simulation unit 38 is provided which produces or generates and/or provides a model of the water supply grid that is described using mathematicophysically based rules. Using this model, the current supply of water (flow, pressure) and the current or estimated water consumption at the individual nodes can be taken as a basis for determining and/or predicting the theoretical, or theoretically to be expected, pressure and flow in the water supply grid, in addition to further information, such as flow rates.

In addition, when the water consumption is known or estimated, the pressure distribution in the water supply system is known or simulated and target positions for the pressure regulation valves are known, the model allows the necessary supply of water to be determined. This model can be used to simulate all conceivable situations which are required by the planning scheduling unit 30 for pump and pressure regulation valve optimization or by the scenario manager.

Depending on the quality and grade of the model, the integration into the control system 12 means that confirmed fault reports from the alarm management unit (such as leak, pipe fracture, faulty pump or pressure regulation valve) can be incorporated into the model automatically, so that a realistic model is always available. This model can also be created using model libraries.

The simulation can either be initiated on an event-controlled basis, e.g., when an alteration in the grid state occurs, or on a time-controlled basis, e.g., in accordance with stipulated time cycles, or manually. The time range and the time steps for which the calculation needs to be performed are stipulated as appropriate in the configuration. By way of example, the simulation can be effected for a period of the next 24 hours in 15 minute time steps. Important data which can be provided from the information management system 26 are the current process data, such as pressures and/or flows, historical data, for example pressures and flows over a period of the last week, for example, and the current settings of the system or grid components, such as pumps and valves. Forecast data can also be employed for use in a simulation model when simulation is necessary over a period which is in the future. Depending on whether the simulation model is to be operated online, e.g., taking account of the current process data, or offline, e.g., taking account of historical data, the requirements for availability of data are different.

To be able to set the suitable pressure in the water supply grid from the point of view of optimum power and cost aspects, a further exemplary embodiment of the present disclosure involves the future global and locally distributed water consumption being estimated by means of the prediction unit 32, with current and historical flow and pressure data in the supply grid and GIS information being able to be used to create a locally resolved model for forecasting the water consumption, where the model repeatedly updates itself and matches itself to the situation. For the purpose of refinement and better estimation of water consumption, it is also possible for weather data and/or production planning data for large operations to be integrated into the model in addition to the flow data.

In order to be able to recognize faults in the system as quickly as possible, an exemplary embodiment of the present disclosure involves an alarm management unit 34 forwarding the conditioned fault reports to the operator or the respective responsible party. The faults are conditioned such that they are classified according to seriousness and type. According to an exemplary embodiment, only the causes of faults rather than the subsequent faults related to the fault, which would overload the operator with information, are displayed. This rule is overridden only if a safety-critical subsequent fault is involved. Depending on the type of fault, the faults can be presented as a text message or graphically.

The displayed alarms may include not only the alarms which are forwarded to the control system 12 from the field, e.g. a controller, but also additional alarms which are produced from individual modules. An example which can be cited in this instance is a monitoring of simulation results— the simulation results for objects are compared with the alarm limits stipulated for these objects, and a specific alarm in a control-system-based alarm list is produced if such a limit is transgressed.

In accordance with an exemplary embodiment, a decision support unit 40 is provided, since in this module or this unit the pending alarms are assessed as appropriate and an estimation of risk is used to determine the relevance of an alarm for the operation of the overall grid.

According to an exemplary embodiment, a leak unit 42 may also be provided which detects and identifies and/or localizes existing and future or imminent leaks and pipe fractures in the water supply grid at an early stage. This involves the use of methods which continually observe and assess the locally resolved online measured values such as pressure and flow history. If unexpected pressure or flow fluctuations arise at a location, the direct and surrounding online signals are analyzed for leaks by an intelligent algorithm and a decision is made about whether there is a fault. To characterize the seriousness and localization of the fault, the water distribution model and the scenario manager can be used, which allow different leak scenarios to be simulated, inter alia.

In accordance with an exemplary embodiment, a decision-making unit 40 can be provided which is used to prompt and/or develop decision proposals for the maintenance and investment planning for the water supply grid and equipment and/or resources in this regard in order to support decision-making. On the basis of cost information from the ERP system, customer queries, electronic maintenance reports, leak and pipe fracture knowledge from the leak unit 42 or leak detection unit, service life calculations and additional information from the field and also empirical values, for example from a knowledge management unit such as an electronic operations journal, it is possible to determine and ascertain maintenance and replacement strategies which are optimum in terms of cost.

The decision support unit 40 performs risk-based assessment and/or weighting and/or prioritization of the pending alarms, which can be stored in the information management system 26, for example, and therefore allows focusing on the alarms which are essential to operation. The assessed alarms that are considered relevant or important are forwarded to the alarm management unit 34.

This allows the number of alarms which the operating personnel need to handle to be minimized. For these alarms, the relevant measures and strategies are then proposed—this can be done on the basis of rules and/or using decision trees which are defined for the individual alarm groups.

On the basis of these proposals, maintenance priorities can be stipulated and an optimum maintenance plan can be created taking account of inventories, available personnel, emergencies, construction permits and site.

The decision support unit 40 and the application in this regard run continuously and/or are executed continuously, with the development of any proposals and/or the assessment of pending alarms being initiated and/or executed and/or performed either on an event-controlled basis, that is to say automatically when an alteration in the grid state occurs, or on a time-controlled basis, e.g., in line with prescribed time cycles, or manually by virtue of instruction, for example by the operating personnel.

In this case too, the respective results, and those from the remaining functional units, can be stored retrievably and accessibly in information management system 26, with standard interfaces such as OPC or proprietary interfaces likewise being able to be used or employed, such as by using application programming interfaces (API).

Since the decision support unit 40 proposes a time-based alarm using an appropriate measure, wherein the decision-making system proposes a measure for handling a problem, no time series are transferred to the information management system 26 in this case.

Furthermore, a fault compensation unit 44 or fault rectification unit may also be provided which, when problems arise in the field or when faults arise in the system, develops and/or provides one or more solutions or solution proposals for correcting and/or rectifying faults on a database and/or rule basis, for example in interaction with the information management system 26 and/or the planning scheduling unit 30, wherein, in manual mode (open loop control), a step-by-step guide is generated and/or provided which assists the respective operator in the fault rectification, or, in automatic mode (closed loop control), the respective fault is rectified by virtue of automatic execution of instructions and/or commands by the system, for example by the fault compensation connected to the control system or by the control system itself. In principle, it is possible to choose between two modes, the open loop control function not being selectable for safety-critical or safety-relevant faults, in order to prevent a delay in the installation shutdown by the user, for example.

Provision may also be made for safety-critical applications always to require "consent" from the operating personnel.

The manual and automatic modes are not only limited to rectifying and correcting faults but can also be used and/or employed for actuating the pumps and pressure regulation valves. In manual mode, the installation operator is notified only of optimum setting proposals by the planning scheduling unit 30, which he can then adopt or otherwise alter. In automatic mode, these values are adopted automatically and the respective installation is automatically operated accordingly.

According to an exemplary embodiment, a scene management unit 48 for supporting the performance and management of scenarios is provided which can be used to simulate and/or realistically recreate various scenarios—whether real or fictitious—scenarios with, by way of example, various active pumps,
pressure regulation valves with arbitrary positions,
filling levels for reservoirs,
isolation of grid areas,
adjustable and locally resolved water consumption and/or possibly leaks in the pipelines being definable and/or specifiable.

Accordingly, up-to-date values from the water supply grid can be adopted and/or can be adjusted specifically and on the basis of requirements and/or notions, particularly on the basis of the notions of an installation operator. As a result, not only is it possible to test and/or check various parameter combinations simulatively, possible fault situations and/or causes, such as leaks, can also be simulated. Close interlocking and/or linking of the individual functional units allows the correct operation and functioning of the alarm management, leakage detection, decision support, open loop/closed loop control and planning scheduling unit to be simulatively checked at the request of the user.

The basis for the scenario manager is the water distribution model, which can be adjusted to suit the desired simulation instance using the prescribed parameters.

According to an exemplary embodiment, a maintenance planning unit 50 is provided which can be used to carefully plan and efficiently perform the maintenance of faulty components. The maintenance planning unit 50 keeps a large amount of information available in retrievable form for each maintenance order, where such information is able to be adjusted and/or complemented by any maintainer, for example when work has been done. The information can be retrieved and/or processed and/or adjusted either by a fixed data processing device, for example by the computer (e.g., CPU) in the maintenance office, or by a mobile terminal, such as a laptop, PDA, virtual reality glasses. This also applies to devices, aids and applications from the field of "augmented reality".

By way of example, the information which can be accessed, inter alia, is the site,
faulty components, fault type and degree of damage (type, position),
operation of the component (logic or circuit diagram, piping diagram, datasheet,
previous work on this component or on adjacent components (record file),
contacts, responsible persons,
possibly condition of the ground,
pictures from the site, map data,
observations or remarks and/or
invoice and order data.

The maintenance planning unit 50 can, for example by means of interfaces provided for this purpose, contain and/or prompt a connection to a computerized maintenance management system (CMMS) or to an enterprise resource planning (ERP) system or a geographical information system (GIS).

A visual display unit 52, which comprises functional options for presenting geographical data and for visually displaying various states of the system, can be used to integrate external applications into the operator workplace or the operator environment of the control system 12 and to visually display the applications. An example is the geographical information system (GIS), in which results from the grid simulation and/or maintenance information and/or grid states and/or positions of employees and/or zones with critical states and/or graphically conditioned alarm information can be indicated and/or displayed in appropriate layers, for example.

A fundamental advantage of the exemplary system and method as described is that the implemented integration allows "a glance at" or a view of the process. Relevant information is available in condensed form, since the various functions are integrated into the overall solution as appropriate. A further advantage is that external applications can be incorporated into the system by the modular application using an integration platform. In this context, it should be emphasized that the data interchange is effected using the integration device, and the individual functional units or modules do not need to be directly integrated with one another, which affords significant advantages particularly in respect of the ability to replace and maintain individual modules or units.

The following advantages can be highlighted for the use of an integrated application of this kind:

the incorporation of a unit for supporting decision-making allows the operator to obtain more information from various applications and/or functional units, on the basis of his level of knowledge regarding the respective situation, without needing to change the system. Furthermore, the operator has the currently optimum options for action in each case available, such as an optimized schedule for the use of pumping stations and pressure reduction valves. Depending on the particular embodiment, the operator can resort to various modes in this context. In addition to an embodiment as an "open loop" (step-by-step instruction to correct a fault), an embodiment as a "closed loop" (automatic performance of necessary actions) is also implementable;

time saving as a result of standard solution: the operator no longer needs to look for important information at various locations, but rather is provided with all the available information in a standard and complete presentation. The consistent interface (look & feel) means that the operator can get to grips with the system more quickly and does not need to learn to use many different incompatible insular systems, in which case a reduction in training time can advantageously be brought about, user friendliness can be increased and/or information can be made available on an object-related basis;

a standard approach to handling alarms and events: alarms and events which are produced from the process (e.g. by means of a controller) can be presented in the alarm and event lists in the same way as alarms which are produced from calculations;

the incorporation of applications for grid simulation allows necessary simulations (e.g. What-If) to be started directly from the operator environment without thereby affecting operation. It is thus possible for additional information to be generated;

results from different applications can be visually displayed in various further applications. By way of example, it is thus possible for alarms which occur to be displayed in integrated geographical information systems in the same way as in process graphics, and combined presentation of space-related and time-related data in a visual display environment is also rendered possible and/or provided;

data from the various applications and sources can be correlated, as a result of which alterations in the water supply grid can be identified at a correspondingly earlier time.

The foregoing features of the system and method of the present disclosure were generally described with respect to the functional features performed by the various components of the system and method. It is to be understood that the components of the system can be implemented by computer processing devices each having a processor (general purpose or application specific) executing computer-readable instructions recorded on a non-transitory computer readable recording medium, such as a non-volatile memory, including, without limitation, a ROM, a hard disk drive, optical memory, flash memory, etc. For example, the central processing device, control system, integration device, functional units, modules, as well as any of the above-described components of the exemplary system of the present disclosure, can be embodied as various computer processing device(s), individually or in combination as appropriate, to carry out the operative functions as described above. As used herein, the storage of information and/or data involves the storage of such information and/or data on such a non-volatile memory.

For example, the information management system 26 described above can include a storage database for storing such information and/or data on a non-transitory computer-readable recording medium.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for at least one of determining and processing state information concerning a water supply grid, the system comprising:
    at least one central data processing device;
    a control system;
    at least one integration device;
    one information management system; and
    functional units, wherein:
    the functional units obtain and provide state information;
    a respective functionality of the functional units is integrated into the control system by means of the integration device such that a functionality of the control system is extended by the functionality of the respective functional unit, and at least one of individual functions and the functionality of the functional units is accessible from the integration device;
    the information management system interacting with the integration device, the control system and the functional units acts as central database and provides a continuous data and information exchange between the control system and the functional units, the functional units being configured to access data and information of other integrated functional units;
    the functional units comprise
        an action planning and scheduling unit configured to perform an operation of optimally actuating pumps for producing flow and pressure in the water supply grid,
        a prediction unit configured to provide a locally resolved estimate of future water consumption in the water supply grid,
        an alarm management unit configured to at least one of deliver fault reports from pumps and/or valves and report a leak in a line section or a grid section, and
        a visual display unit comprising functional options for presenting geographical data and for visualizing various states of the system, the visual display unit being configured to communicate with the respective functional unit and an application thereof, transmit selections of a user to the application, transmit responses and results from the respective application to the user, and visualize temporally and locally conditioned information and data;
    the estimate of the future water consumption serves as a basis for the optimal actuation of the pumps performed by the planning scheduling unit; and
    at least one of (i) the fault reports from pumps and valves and (ii) the report on a leak are taken into account in the pump actuation optimization operation and reacted to accordingly, such that faulty pumps are no longer actuated, areas which contain a faulty pressure regulation valve, in particular if the valve is closed or off and can no longer be controlled, are fed with a different control strategy than before, and that high pressures in lines with leaks are avoided.

2. The system according to claim 1, wherein the areas which contain a faulty pressure regulation valve include at least one of the valve being closed or off and being no longer able to be controlled.

3. The system according to claim 1, wherein external applications are integratable into an operator environment of the control system by means of the visual display unit,
wherein a geographical information system grid displays at least one of states and zones with critical states and/or graphically conditioned alarm information.

4. The system according to claim 1, wherein the functional units comprise a simulation unit which is configured to provide a model of the water supply grid that is described on the basis of mathematicophysical rules,
wherein the model as well as at least one of the current water supply and the current or estimated water consumption at individual nodes of the water supply grid are used for at least one of determining and predicting expected pressure and flow in the water supply grid, and
wherein confirmed fault reports from the alarm management unit are incorporated into the model automatically.

5. The system according to claim 1, comprising:
a leak detection unit configured to identify and localize, by means of locally resolved online measured values, future or imminent leaks and pipe fractures in the water supply grid at an early stage,
wherein for localization of the fault and for characterizing its seriousness, a water distribution model and a scenario management unit are used which allow different leakage scenarios to be simulated.

6. The system according to claim 1, comprising:
a pressure regulation unit configured to bring about optimum pressure conditions in the water supply grid via an optimized actuation of pressure regulation valves,
wherein the pressure regulation unit is configured to calculate a target opening value which is optimized from the point of view of power and cost aspects based on a predetermined optimized pump schedule, which is at least one of provided by means of the action planning and scheduling unit and based on at least one of estimated water demand and prevailing pressure for each pressure regulation valve.

7. The system according to claim 1, comprising:
a fault compensation unit configured to, when faults arise in the system, provide one or more solution proposals for at least one of correcting and rectifying faults on a database and/or rule basis, in interaction with the action planning and scheduling unit,
wherein, in a manual mode of the fault compensation unit, a step-by-step guide is generated which assists a respective operator in the fault rectification, and, in automatic mode of the fault compensation unit, the respective fault is rectified by virtue of automatic execution of at least one of instructions and commands by the fault compensation unit connected to the control system or by the control system itself.

8. The system according to claim 1, comprising:
a decision making unit configured to perform at least one of a risk-based assessment, weighting and prioritization of pending alarms, and forward those alarms to the alarm management unit which are considered relevant or important.

9. The system according to claim 8, wherein the decision making unit is configured to develop decision proposals for at least one of (i) maintenance and investment planning for the water supply grid and (ii) corresponding equipment, by determining cost-effective maintenance and replacement strategies on the basis of cost information from an enterprise resource planning system, customer queries, electronic maintenance reports, leak and pipe fracture knowledge from the leak detection unit, service life calculations and additional information from the field as well as empirical values.

10. The system according to claim 1, wherein the results of action planning are transferrable to the information management system in a form of time series and stored therein.

11. The system according to claim 2, wherein pending alarms are displayed in the geographical information system in a same way as in process graphics.

12. The system according to claim 3, wherein confirmed fault reports from the alarm management unit are automatically incorporated into the model of the water supply grid, so that a realistic model is always available.

13. The system according to claim 1, wherein the integration device comprises an integration unit configured to incorporate and access at least one of operator interfaces and operator elements of the functional units and applications, and provide a direct view of the respective application and/or functional unit from the integration device for processing directly in the respective application and/or functional unit.

* * * * *